United States Patent [19]

Ando et al.

[11] 4,435,343
[45] Mar. 6, 1984

[54] METHOD FOR MANUFACTURING AN INFORMATION MEMORY DISK

[75] Inventors: Hideo Ando; Isao Suzuki, both of Tokyo, Japan

[73] Assignee: Tokyo Shibaura Denki Kabushiki Kaisha, Kawasaki, Japan

[21] Appl. No.: 396,594

[22] Filed: Jul. 9, 1982

[30] Foreign Application Priority Data

Jul. 20, 1981 [JP] Japan ................. 56-113244

[51] Int. Cl.³ ............................................. B29D 17/00
[52] U.S. Cl. ................................ 264/22; 264/40.1; 264/107; 264/155; 264/219; 425/810
[58] Field of Search ............... 425/810; 264/106, 107, 264/154, 155, 156, 22, 219

[56] References Cited

U.S. PATENT DOCUMENTS

| | | | |
|---|---|---|---|
| 3,875,024 | 4/1975 | Picquendar | 264/106 X |
| 4,038,009 | 7/1977 | Toull | 425/810 X |
| 4,354,988 | 10/1982 | Bricot | 264/106 X |

*Primary Examiner*—Thomas P. Pavelko
*Attorney, Agent, or Firm*—Cushman, Darby & Cushman

[57] ABSTRACT

A method for manufacturing an information memory disk comprises a process for preparing a die having an annular first rugged portion corresponding to tracks, and an annular second rugged portion corresponding to a positioning mark and concentrically located against the tracks, a process for manufacturing by the use of the die a blank having an annular rugged tracks corresponding to the first rugged portion and an annular rugged positioning mark corresponding to the second rugged portion, a process for detecting the position of the center of the blank on the basis of the positioning mark, a process for boring a hole centering around the center of the positioning mark through the blank, and a process for forming a light reflecting layer on the annular rugged track.

12 Claims, 16 Drawing Figures

METHOD FOR MANUFACTURING AN INFORMATION MEMORY DISK

BACKGROUND OF THE INVENTION

This invention relates to a method for manufacturing an information memory disk on which information is to be recorded or has previously been recorded in an optical manner.

Conventional disks of this type are provided with a reflecting layer formed thereon, on which circular tracks are formed. In recording, a laser beam is converged on the track to form ruggedness signals thereon, or part of the reflecting layer is removed to form pit signals. The use of such optical disks in the recording enables or facilitates high-density recording, non-contacting reproduction, high-speed random access, prolonged stroage, simple recording system, additional recording, low cost per bit, etc. Thus, the optical disks may widely be used as media for both recording and reproduction or for reproduction use only. The disks for reproduction use only can be used as video disks for household use, video disks for commercial use, audio PCM disks, etc. As for the disks of the recording-reproduction type, they can be applied to document file systems, video file systems, universal memories for computers, etc.

One such prior art disk is generally composed of a transparent base of synthetic resin having a circular hole in its center, and a metallic reflecting layer attached to one surface of the base. The track on which information is to be recorded or has previously been recorded is in the form of a spiral groove or multi-ring grooves.

Pressing and injection molding are typical conventional methods for manufacturing the base. The pressing method is used in the manufacture of ordinary records or disks. In this method, a material is pressed between a lower die and an upper die bearing a stamper thereon. At the same time, the circular center hole is formed by means of a columnar projection at the central portion of one of the two dies. After the pressing is completed, the outer peripheral portion of a blank is shaved to determine the outside diameter thereof, and thus the base is finished. In the injection molding method, a resin material is injected between upper and lower dies to form a disk member, and then a circular hole is bored through the central portion of the disk member to form the base.

In the case of the pressing method, the accuracy of alignment between the center of the circular hole of the base and the center of the tracks depends on the accuracy of attachment of the stamper to the upper die. In this method, it is quite difficult to restrict the eccentricity to such a low degree that information can be recorded and reproduced at high density with a track width of 0.8 $\mu$m to 0.9 $\mu$m and a track pitch of 2 $\mu$m or less. Thus, the track width and pitch cannot help being large.

In the latter case where the circular hole is formed after the injection molding, the outer periphery of the disk member is already fixed when the disk member is prepared. If the circular hole is formed in the basis of the outer periphery, therefore, the center of the circular hole will not meet the center of the previously formed track, resulting in the same difficulty as in the case of the pressing method. If the circular hole is formed in the basis of the track, on the other hand, the circular hole will be deviated as against the outside diameter of the base, possibly causing vibration.

SUMMARY OF THE INVENTION

The object of this invention is to provide a method for manufacturing an information memory disk capable of high-accuracy alignment between a hole in the center of a base and a track on which signals are to be recorded or have previously been recorded.

BRIEF DESCRIPTION OF THE DRAWINGS

FIGS. 1 and 2 show an information memory disk obtained by a manufacturing method according to an embodiment of this invention, in which FIG. 1 is a plan view, and FIG. 2 is a sectional view as taken along line 2—2 of FIG. 1;

DETAILED DESCRIPTION OF THE PREFERRED EMBODIMENT

There will now be described a method for manufacturing an information memory disk according to an embodiment of this invention with reference to the accompanying drawings.

Figure 1:
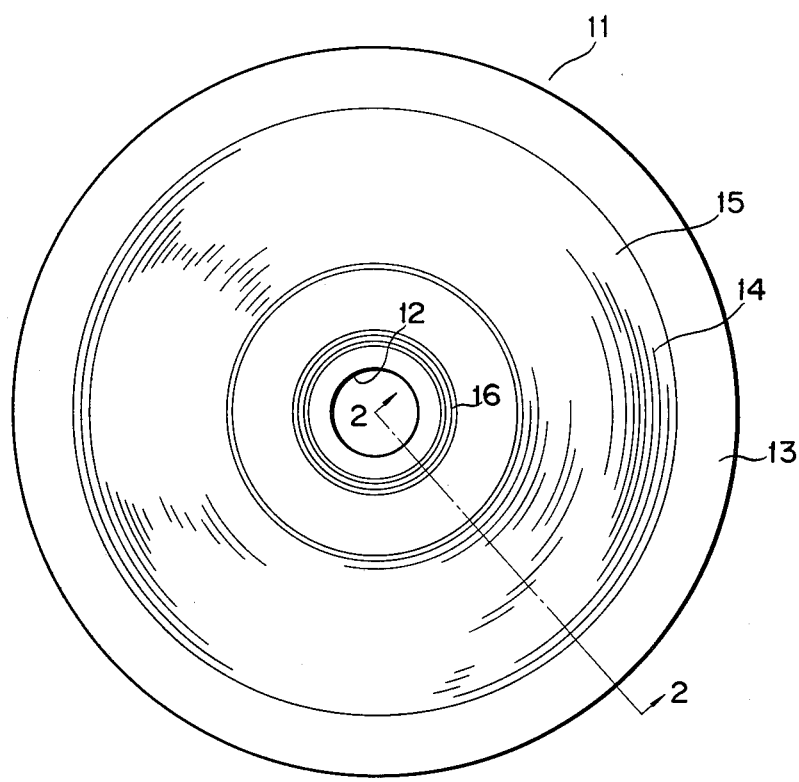
Figure 2:
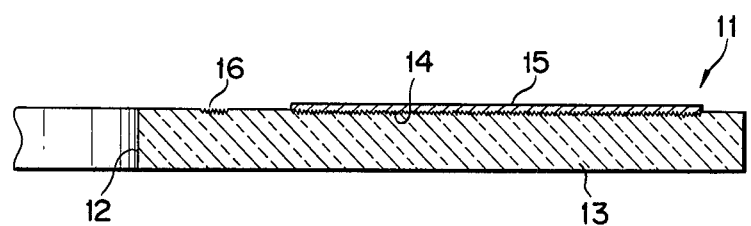

Referring first to FIGS. 1 and 2, an information memory disk manufactured by the method of the invention will be described to facilitate the understanding of the invention.

An information memory disk 11 is formed of transparent synthetic resin, and has a circular base 13 with a thickness of approximately 1.2 to 1.5 mm. A circular hole 12 is bored through the central portion of the base 13. On the upper surface of the base 13, tracks 14 are formed concentrically with the circular hole 12 at predetermined radial intervals or pitches. The tracks 14 are in the form of grooves having a width of approximately 0.8 $\mu$m and a 2-$\mu$m pitch. The upper surface of the base 13 is overspread with a light reflecting layer (recording layer) or film 15. The reflecting layer 15 is formed of metal, such as Te, Bi, In or Al, and has a thickness of approximately 1,000 Å. Information is formed in a pattern of pits on an information forming layer formed of the reflecting layer 15 by scanning with a laser beam converged on the layer 15 from the side of the base 13. Alternatively, the information has previously been formed on the layer 15 in a pattern of ruggedness. The information can be reproduced by means of a laser beam.

The innermost track 14 is at a short distance from the center of the base 13, and no track exists at the central portion of the base 13. Put between the central portion of the base 13 and the track 14 is a base center positioning mark 16 which is formed of an annular groove concentric with the track 14. The mark 16 may be spiral or discontinuous. Instead of being a groove, moreover, the mark 16 may be a ridge or elongate projection. The mark 16 is formed simultaneously with the track 14.

Referring now to FIGS. 3A to 9, there will be described a method for manufacturing the information memory disk of the above-mentioned construction.

First, there will be described a method for manufacturing a die used for the manufacture of the base 13.

Figure 3A:
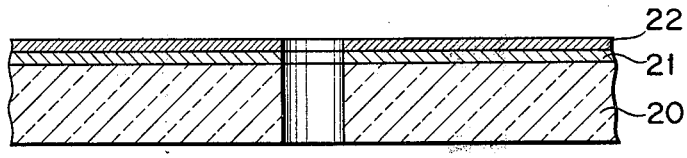
FIGS. 3A to 3G are sectional views successively showing processes for manufacturing a blank of a base of the disk.
Figure 3B:
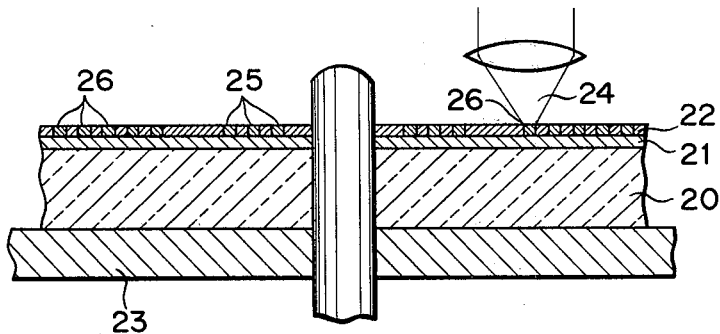
Figure 3C:
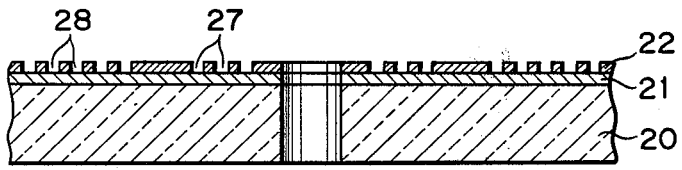
Figure 3D:
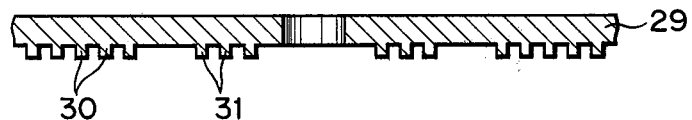

A photo-resist layer 22 is formed over the upper surface of a glass disk member 20 having a hole in its center, with an adhesive agent 21 between the layer 22 and the member 20, as shown in FIG. 3A. Then, the disk member 20 is fixed on a rotating table 23, and rotated about the central hole. At this time, a laser beam 24 is converged on the photo-resist layer 22, and those portions 25 and 26 of the photo-resist layer 22 which correspond to the positioning mark 16 and the track 14, respectively, are exposed as the disk member 20 rotates, as shown in FIG. 3B. Then, the photo-resist layer 22 is developed and fixed, and the exposed portions 25 and 26 are removed by etching. Thus, annular grooves 27 and 28 are formed, as shown in FIG. 3C. A metal layer, e.g., a nickel deposit, is formed on the photo-resist layer 22 formed in the aforesaid manner. Then, a stamper 29 with ridges 30 and 31 is formed by removing the members 20, 21 and 22 from the metal layer, as shown in FIG. 3D. The stamper 29 is attached to a die base 32 to form a die 33, as shown in FIG. 3E.

There will now be described a method for manufacturing a blank of the base by the use of the aforesaid die 33.

Figure 3E:
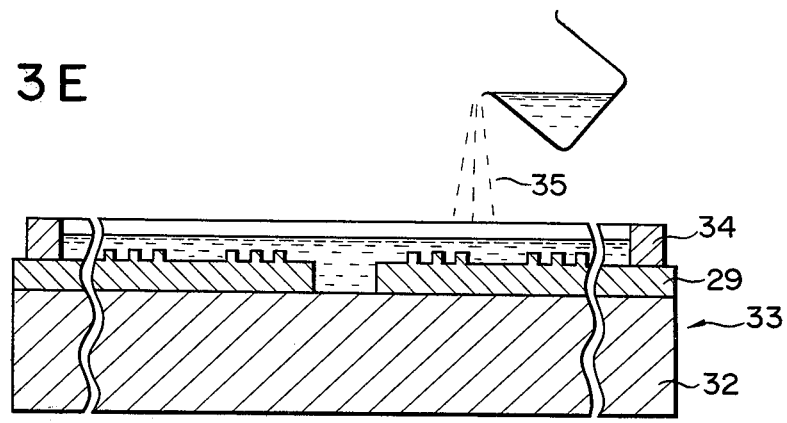
Figure 3F:
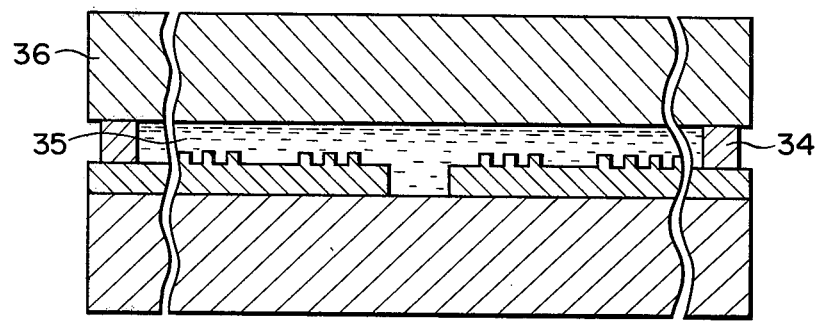
Figure 3G:
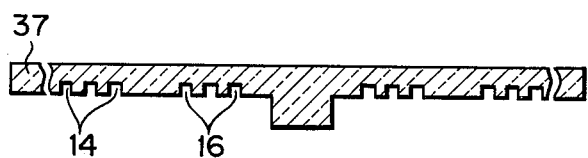
Figure 4:
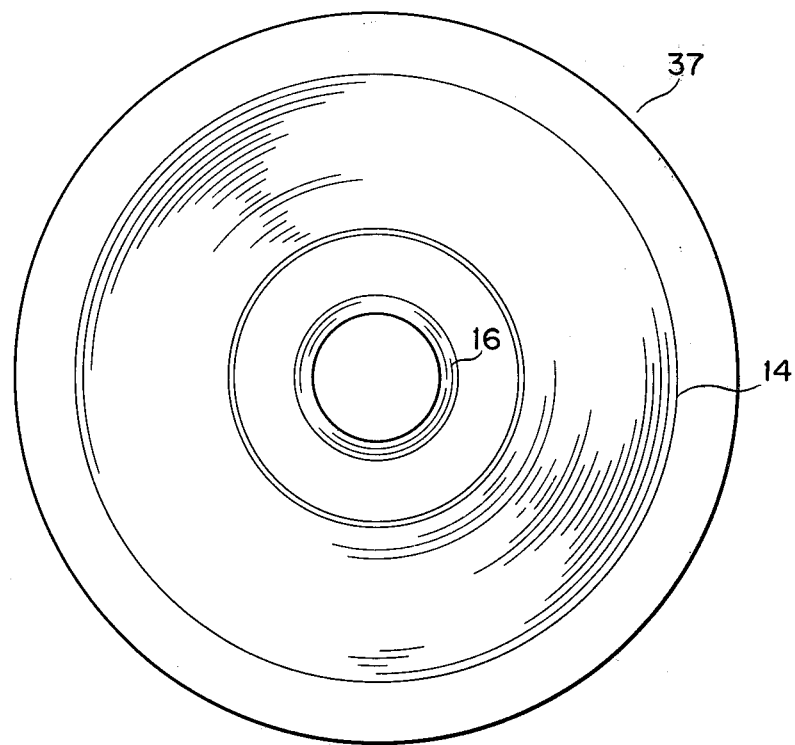
FIG. 4 is a plan view of the blank obtained.

As shown in FIG. 3E, the die 33 is set with the stamper 31 upward, and a ring-shaped spacer 34 is laid substantially concentrically on the peripheral edge portion of the stamper 31. An organic resin monomer 35 is poured on the stamper 29 within the spacer 34. After the monomer 35 is poured to a predetermined amount, a flat board 36 is placed as a weight on the spacer 35 to cover the monomer 35, as shown in FIG. 3F. Then, the monomer 35 is heated to a predetermined temperature to be polymerized. Finally, the polymerized monomer 35 is removed from the die 33, and a blank 37 as shown in FIG. 3G is obtained. Grooves to serve as the tracks 14 and the positioning mark 16 are on the blank 37. As seen from the top view of FIG. 4, the tracks 14 are concentric with the mark 16. The outside diameter of the blank 37 is a little greater than that of the base 13 to be formed therefrom.

Figure 5A:
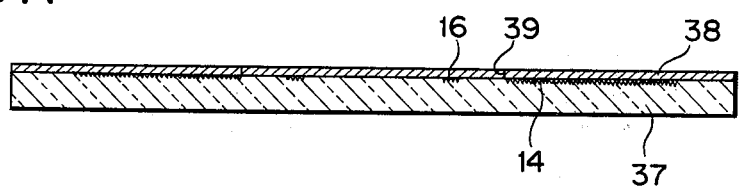
FIG. 5A is a sectional view showing the blank overspread with a protective sheet.
Figure 5B:
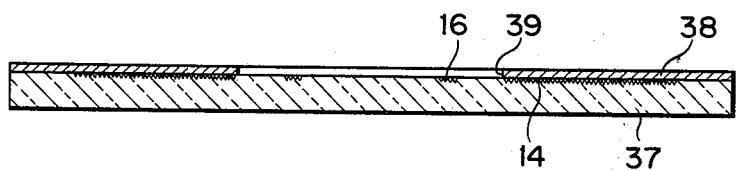
FIG. 5B is a sectional view showing the blank from which part of the protective sheet is stripped.
Figure 6:
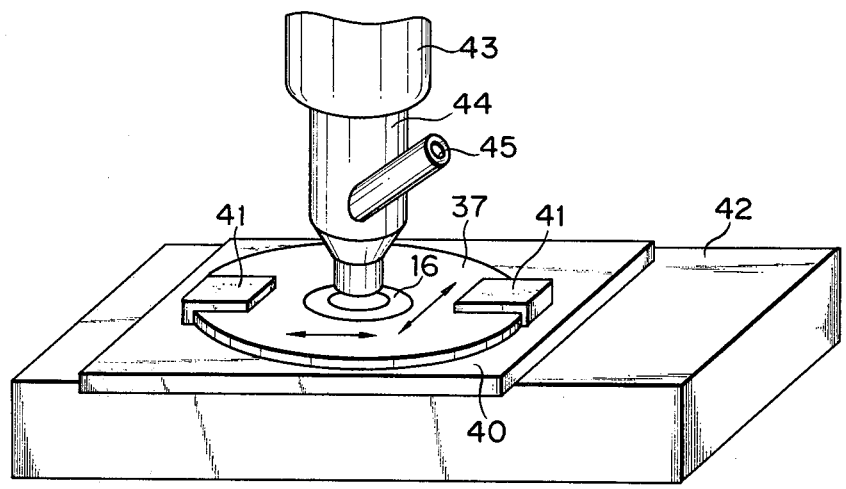
FIG. 6 is a perspective view of an apparatus for illustrating the positioning operation for the blank.
Figure 7:
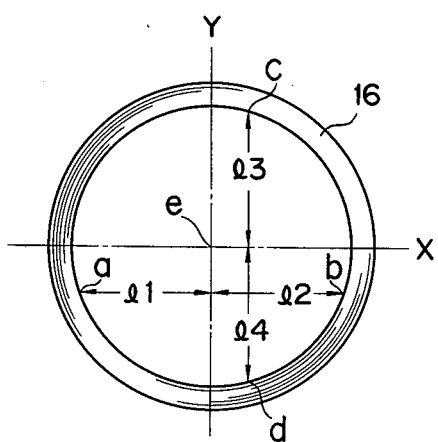
FIG. 7 shows the relationships between a center positioning mark and X and Y directions for illustrating the center positioning operation.

After a boss portion in the center of the upper surface of the blank 37 is removed, the upper surface of the blank 37 is overspread with a protective sheet 38 formed of a synthetic resin film, as shown in FIG. 5A. A circular incision 39 is previously formed in the protective sheet 38 so as to be located between the track 14 and the mark 16. Subsequently, as shown in FIG. 5B, the central portion of the protective sheet 38 is removed along the incision 39 to expose the central portion of the blank 37 and the positioning mark 16 (the tracks 14 are covered with the protective sheet 38). As shown in FIG. 6, the blank 37 is fixed on a traveling table 40 by means of clamping jigs 41. The table 40 can move in X and Y directions on a support 42. A scale is provided between the table 40 and the support 42 for high-accuracy detection of the shifted position (moved distance) of the table 40. Further, a microscope 44 is coaxially detachably supported on the underside of a rotating support member 43, facing the table 40 from above.

Figure 8:
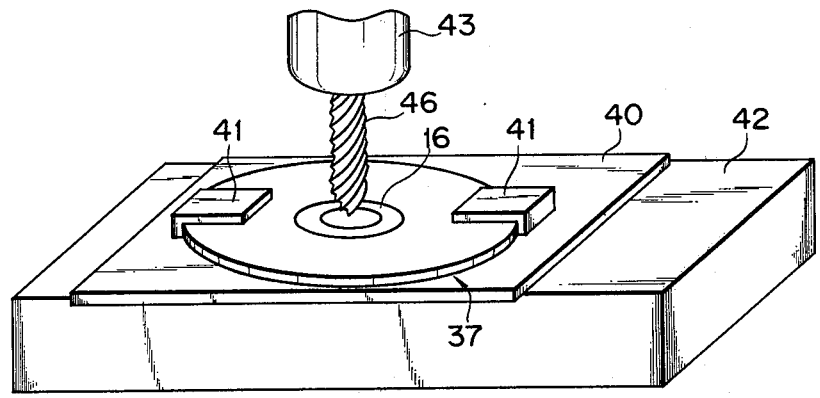
FIG. 8 is a perspective view showing a process for forming a circular hole in the center of the base.

An operator moves the table 40 in the X and Y directions while watching the blank 37 through an eyepiece section 45 of the microscope 44. In moving the table 40 in the X direction, two positions a and b on the innermost periphery of the positioning mark 16 are detected, when those positions are measured by means of the scale (see FIG. 7). The table 40 is moved in the X direction so that the central axis of the microscope 44 lies halfway (in a middle position where distance l1=distance l2) between the positions a and b measured in the aforesaid manner, and the table 40 is then moved in the Y direction while the central axis of the microscope 44 is kept in the middle position (central position in the X direction). Also in moving the table 40 in the Y direction, two positions c and d on the innermost periphery of the positioning mark 16 are detected. Then, the table 40 is moved so that the central axis of the microscope 44 lies halfway (in a middle position where distance l3=distance l4) between the positions c and d. A position e thus reached by the central axis of the microscope 44 is the position of the center of the positioning mark 16 and hence the center position of the tracks 14. In this position, the microscope 44 is removed from the rotating support member 43, and a drill bit 46 is coaxially attached to the support member 43, as shown in FIG. 8, instead. Then, the circular hole 12 (see FIG. 1) is bored through the blank 37 as the support member 43 is lowered while rotating. The circular hole 12 thus formed has its center in the position e, and is hence concentric with the center of the positioning mark 16. The diameter of the circular hole 12 may be set on the basis of (only) the diameter of the drill bit 46. When boring after drilling, however, the diameter of the circular hole 12 may be set on the basis of the diameter of a boring bar.

Figure 9:
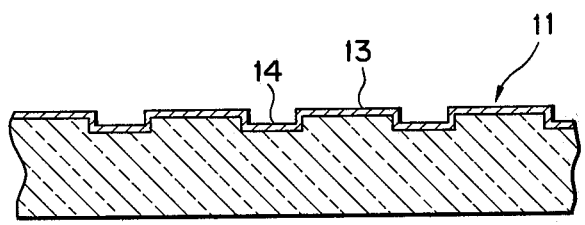
FIG. 9 is a sectional view showing part of the disk on which information is recorded in a rugged pattern.

Subsequently, the blank 37 is removed from the table 40, the outer periphery of the blank 37 is shaved to a predetermined degree on the basis of the position of the circular hole 12 as its center, and thus the base 13 is obtained. Thereafter, the protective sheet 38 is removed from the upper surface of the base 13, and then a metal, such as Al or Te, is deposited on the tracks 14 by vacuum evaporation to form the light reflecting layer (recording layer) or film 15, as shown in FIG. 9, thereby completing the information memory disk. The disk thus obtained may be used as it is. Alternatively, two such disks may be joined together so that their respective reflecting layers may face each other with a narrow space or an adhesive agent between them. In doing this, the two disks can readily be aligned with good accuracy by fixing them on the basis of the positions of their respective circular holes.

In the above-mentioned embodiment, the laser beam to which the photo-resist layer 22 is exposed may or may not have been modulated by write information. If the laser beam is modulated, no signals are recorded on the track of the resultant disk, so that the disk may serve as one for recording. Recording of signals on the track of such disk can be achieved by the use of a modulated laser beam. The grooves forming the tracks may be utilized as a tracking guide in recording the signals. If the laser beam is not modulated, on the other hand, signals have already been recorded on the track of the resultant disk, so that the disk may serve as one for reproduction only.

The positioning mark may be formed of a groove, as in the foregoing embodiment, or of a ridge or elongate projection. Alternatively, the innermost portion of the track may be used in place of the mark.

The detection of the center position of the blank by the use of the positioning mark is not limited to the method in which the central points in the X and Y directions are pursued, as in the foregoing embodiment. For example, the central point may be detected by rotating and gradually moving in the X and Y directions the blank while watching the mark through the microscope. Alternatively, the center position may be detected as the intersection of the perpendicular bisector of a segment connecting a pair of points on the mark and the perpendicular bisector of another segment connecting another pair of points on the mark.

In the foregoing embodiment, the base is formed by shaving the periphery of the blank to a fixed degree. If the diameter of the blank used is a prescribed one, the blank may be used directly as the base.

In the method for manufacturing an information memory disk according to this invention, as described above, a blank is made by using a die on which are previously formed an annular first rugged portion (groove in the embodiment) corresponding to a track and an annular second rugged portion (groove in the embodiment) corresponding to a positioning mark concentric with the track, and the center position of the blank is detected on the basis of the positioning mark. Thus, a hole to be formed in the central portion of the blank can readily be formed with high accuracy so as to be coaxial with the track. The positioning mark may be formed outside the outermost track or between the adjacent tracks.

What we claim is:

1. A method for manufacturing an information memory disk comprising the steps of:
   (a) preparing a die having one surface on which are formed an annular first rugged pattern corresponding to tracks, and an annular second rugged pattern corresponding to a positioning mark and concentrically located against the tracks;
   (b) manufacturing by the use of the die a blank having one surface on which are formed an annular rugged track corresponding to the first rugged pattern and an annular rugged positioning mark corresponding to the second rugged pattern;
   (c) detecting the position of the center of the blank on the basis of the positioning mark;
   (d) boring a hole through the blank centered upon the center of the positioning mark; and
   (d) forming a light reflecting layer on the annular rugged track.

2. A method for manufacturing an information memory disk according to claim 1, wherein step (a) is practiced by the steps of (i) forming a photo-resist layer on a base, (ii) applying a light beam to the photo-resist layer shifted in a diametrical direction while rotating the base, (iii) removing the irradiated portion of the photo-resist layer in a rugged manner by selective etching, and (iv) placing a die material on the photo-resist layer to form, with the aid of the ruggedly removed portion of the photo-resist layer, the die on which are formed the annular first rugged pattern corresponding to the track and the annular second rugged pattern corresponding to the positioning mark.

3. A method for manufacturing an information memory disk according to claim 2, wherein step (ii) is practiced by applying a fixed quantity of light in a continuous manner.

4. A method for manufacturing an information memory disk according to claim 2, wherein step (ii) is practiced by applying a quantity of light varying in response to a recording signal.

5. A method for manufacturing an information memory disk according to claim 1, wherein said tracks and said positioning mark are each formed of a spiral groove.

6. A method for manufacturing an information memory disk according to claim 1, wherein said tracks and said positioning mark are each formed of a plurality of concentric grooves.

7. A method for manufacturing an information memroy disk according to claim 1, wherein step (c) is practiced by moving the blank in X and Y directions to detect points on the positioning mark in both directions and to recognize the middle point between the points on the reference mark as the center position of the mark.

8. A method for manufacturing an information memory disk according to claim 1, further comprising, directly following step (b), the further step of (1) providing a protective cover on the surface of the blank so as to cover the tracks, and, directly following step (d), the step of (2) removing the protective cover from the blank.

9. A method for manufacturing an information memory disk according to claim 1, further comprising the step of shaving the periphery of the blank centering around the central hole thereof to complete the base.

10. A method for manufacturing an information memory disk according to claim 1, wherein step (a) is practiced by applying a beam of energy on a layer of a base relatively shifted in a diametrical direction against the base, while relatively rotating the base against the beam, the portion applied with the beam of energy constituting the annular first and second rugged patterns.

11. A method for manufacturing an information memory disk according to claim 10, wherein said beam is shifted in a diametrical direction of the base while rotating the base to form the first and second rugged patterns.

12. A method for manufacturing an information memory disk comprising the steps of:
   (a) preparing a die having one surface on which are formed an annular first rugged pattern corresponding to tracks, and an annular second rugged pattern corresponding to a positioning mark and concentrically located against the tracks;
   (b) manufacturing by the use of the die a blank having one surface on which are formed an annular rugged track corresponding to the first rugged pattern and an annular rugged positioning mark corresponding to the second rugged pattern;
   (c) detecting the position of the center of the blank on the basis of the positioning mark by moving the blank in X and Y directions to detect points on the positioning mark in both directions and to recognize the middle point between the points on the reference mark as the center position of the mark;
   (d) boring a hole through the blank centered upon the center of the positioning mark; and
   (e) forming a light reflecting layer on the annular rugged track.

* * * * *